US006408431B1

United States Patent
Heughebaert et al.

(10) Patent No.: US 6,408,431 B1
(45) Date of Patent: Jun. 18, 2002

(54) METHOD AND APPARATUS FOR MULTI-LANGUAGE SOFTWARE CODE GENERATION

(75) Inventors: Andre Heughebaert, Chaumont Gistoux; Luc De Ceulaer, Dilbeek, both of (BE)

(73) Assignee: Sony Europa B.V., Badhoevedorp (NL)

( * ) Notice: Subject to any disclaimer, the term of this patent is extended or adjusted under 35 U.S.C. 154(b) by 0 days.

(21) Appl. No.: 09/101,675

(22) PCT Filed: Nov. 26, 1997

(86) PCT No.: PCT/EP97/06701
§ 371 (c)(1),
(2), (4) Date: Feb. 26, 1999

(87) PCT Pub. No.: WO98/24020
PCT Pub. Date: Jun. 4, 1998

(30) Foreign Application Priority Data

Nov. 27, 1996 (EP) .............................................. 96203335

(51) Int. Cl.[7] ................................................. G06F 9/44
(52) U.S. Cl. ......................... 717/106; 717/139; 717/114
(58) Field of Search ................................. 717/1, 2, 9, 5, 717/100, 106, 151, 136, 124, 101–105, 107–123, 147, 137–139, 114, 117; 700/86; 709/101

(56) References Cited

U.S. PATENT DOCUMENTS

| 4,796,179 | A | * | 1/1989 | Lehman et al. | 700/86 |
|---|---|---|---|---|---|
| 5,428,782 | A | * | 6/1995 | White | 709/101 |
| 5,493,675 | A | * | 2/1996 | Faiman, Jr. et al. | 717/151 |
| 5,499,371 | A | * | 3/1996 | Henninger et al. | 717/108 |
| 5,522,079 | A | * | 5/1996 | Acker et al. | 717/170 |
| 5,675,805 | A | | 10/1997 | Boldo et al. | 717/114 |
| 5,699,310 | A | * | 12/1997 | Garloff et al. | 717/108 |
| 5,860,072 | A | * | 1/1999 | Schofield | 707/101 |

FOREIGN PATENT DOCUMENTS

EP 0735467 A2 10/1996 ............. G06F/9/45

OTHER PUBLICATIONS

Aimar et al., "A Configurable Code Generator for OO Methodologies," Cern Technical Report No.: CERN–ECP–94–15, Oct. 10, 1994, Geneva, Switzerland.
Auerbach et al., "The Concert Signature Representation: IDL as Intermediate Language," ACM Sigplan Notices, vol. 29, No. 8, Aug. 1, 1994.
Huang et al., "A Rule–Based Tool for Reverse Engineering from Source Code to Graphical Models," Proceedings of 4th International Conference on Software Engineering and Knowledge Engineering, Capri, Italy, Jun. 15–20, 1992.
Lea et al.. "PSL: Protocols and Pragmatics for Open Systems," May 1995, Sun Technical Report No. 95–36.

* cited by examiner

Primary Examiner—Tuan Q. Dam
Assistant Examiner—Hoang-Vu Antony Nguyen-Ba
(74) Attorney, Agent, or Firm—Frommer Lawrence & Haug LLP; William S. Frommer; Darren Simon

(57) ABSTRACT

A method of generating code for a software program in multiple languages by converting input specification files into output code files. The input specification files contain a list of distinctive features of the software program to be generated and are written in a prescribed input language. The input specification files are converted into a set of nodes representing the logical relationship between the distinctive features listed in the input specification files. Output code files are then generated from the set of nodes using external guideline files that contain guidelines for generating code. Output code files are generated in at least two code languages.

10 Claims, 4 Drawing Sheets

METHOD AND APPARATUS FOR MULTI-LANGUAGE SOFTWARE CODE GENERATION

The present invention relates to a method and system for generating program code, for example source code and text code describing the source code.

In the design and implementation phase of software programming it is possible to use code generators to facilitate generation of program code. For instance the XWindows graphic system, which is known in the UNIX environment, provides code generators that produce the necessary code for a user interface according to a set of specifications.

In general a code generator extracts information from an input file or specification file and produces an output file, e.g. a source file, that is understandable by a compiler. The compiler then is able to generate from this source file an executable of executable file of machine code. The code generator produces a very large part of the source code to be written. The remaining part, which mostly is the program's logic, has to be written by hand.

Code generation by a way of a code, generator has many advantages. When for example there exists repetitive patterns in the code to be written which must be replicated many times, a code generator can greatly reduce the effort the programmer has to make by reducing the number of lines to be manually written. Another advantage of code generation is that the naming in the software program becomes consistent throughout the entire program. Also consistency between the source code and the corresponding documentation code or documentation text can be greatly improved. Because of the fact that a great part of the program lines to be written is written automatically, design and implementation changes can be implemented within very short time. Also the number of bugs in the produced software code can be reduced.

Prior art code :generators, hereafter named dedicated code generators, are dedicated to one single language. The input to the code generator is in this case a fully prescribed specification file which is a listing of distinctive features which are used to define the specific aspects of the program code to be generated, for example instances, message names, types, attributes, links etc. The code generator generates an output file, for example a source file. The coding rules for conversion of the input file are build into the code generator itself (i.e. hard coded). A code generator dedicated to two languages must have two sets of coding rules hardcoded. This means that the dedicated code generators are not flexible in that both the input language and the output language are fixed and the coding rules have to be hardcoded into the code generator.

The present invention however provides a code generator wherein the language of the specification of the program to be build and the resulting code language are flexibly chosen by specifying external sets of coding rules or guidelines. In this case the specification file can be of an arbitrary format. According to a separate language descriptor the specification file is converted into a input file to the code generator. According to external guidelines the input file is converted into one or more code files, for example a $C^{++}$ source code file, a HTML documentation file describing the source code or a Unix makefile.

The present invention therefore relates to a method for generating code for a software program comprising:

specifying one or more input files describing the functionality of the software program according to a prescribed input language;

supplying first and second guidelines to code generator means wherein first and second guidelines describe the first and second rules respectively for conversion of said one or more input files;

supplying the input files to code generator means, wherein the code generator means convert the input files according to the first guidelines into one or more first code files and according to the second guidelines into one or more second code files.

The invention also comprises a method comprising:

supplying first and second language descriptors to interpretation means;

supplying a specification file describing the functionality of the software program to the interpretation means; wherein the interpretation means convert the specification file according to the first language descriptor into a first input file and according to the second language into a second input file.

The present invention also comprises the method for generating code for a software program comprising:

supplying one or more specification files describing the functionality of the software program to interpreter means;

supplying first and second specification language descriptors to interpreter means;

converting by the interpretation means of the specification files according to the first language descriptor into a first input to code generator means and according to the second language descriptor into a second input to code generator means;

supplying first and second guidelines to code generator means wherein first and second guidelines define the first and second rules respectively for conversion of the first and second input respectively;

converting the first input according to the first guidelines into one or more first code files and according to the second guidelines into one or more second code files converting the second input according to the first guidelines into one or more third code files and according to the second guidelines into one or more fourth code files.

The present invention also relates to a drawing simulation tool of message passing in an object-oriented operating system. This drawing tool allows to describe Message Sequence Charts (or MSC) representing concurrent objects exchanging asynchronous messages.

The present invention also comprises the system which implements the methods mentioned above.

The present invention will now be described by way of preferred embodiments with reference to the accompanying drawings, throughout which the like-parts are referred to by like-references, and in which.

Figure 1:
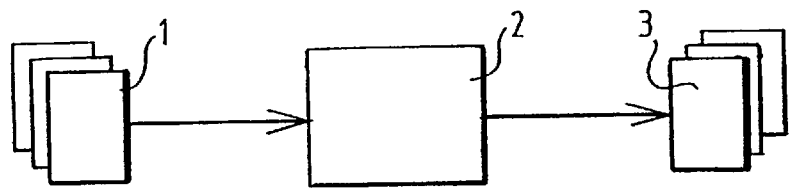
FIG. 1 shows schematically a prior art dedicated code generator.

FIG. 1 shows a prior art dedicated code generator 2. The input file 1 to the code generator 2 is a text file describing the functionality and features of the software program to be generated. The input file can for example be written in IDL (Interface Definition Language) which is a standard language defined by the OMG (Object Management Group). IDL is a technology-independent syntax describing software components in an object oriented and implementation independent way. Coding rules are build in the code generator. The output file 3 is in this case a C++ source file which is compiled by a C++ compiler to machine code which in turn can be executed by the central processing unit of a computer system. As the coding rules that control the conversion from input to output file are hardcoded into the code generator, the code generator can only be used for this combination of input format and the output format, viz. in this case IDL and C++ respectively. For other combinations of output and input file format a separate code generator has to be provided.

Figure 2:
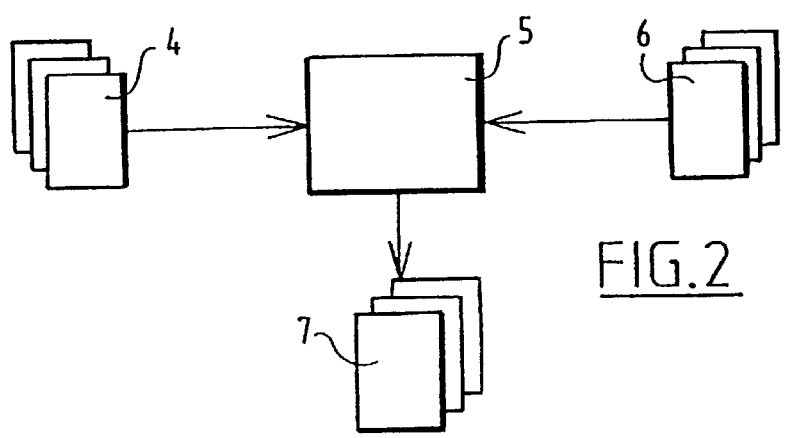
FIG. 2 shows schematically a code generator with external coding rules or guidelines.

In FIG. 2 a generic code generator 5 according to a preferred embodiment is shown. The guidelines 6 that define the code rules, i.e. all operations that will be performed on the input file 4 to create the necessary output code, are external in the sense that they are not part of the program code of the code generator itself. The guidelines can be comprised in one or more separate files on the hard disk of the computer system. Changing the external guidelines changes the output code files 7 accordingly. Compared to a dedicated code generator the generic code generator with external guidelines provides flexible means for generating from files with a fixed, prescribed input format or definition the desired program code or documentation code.

Figure 3:
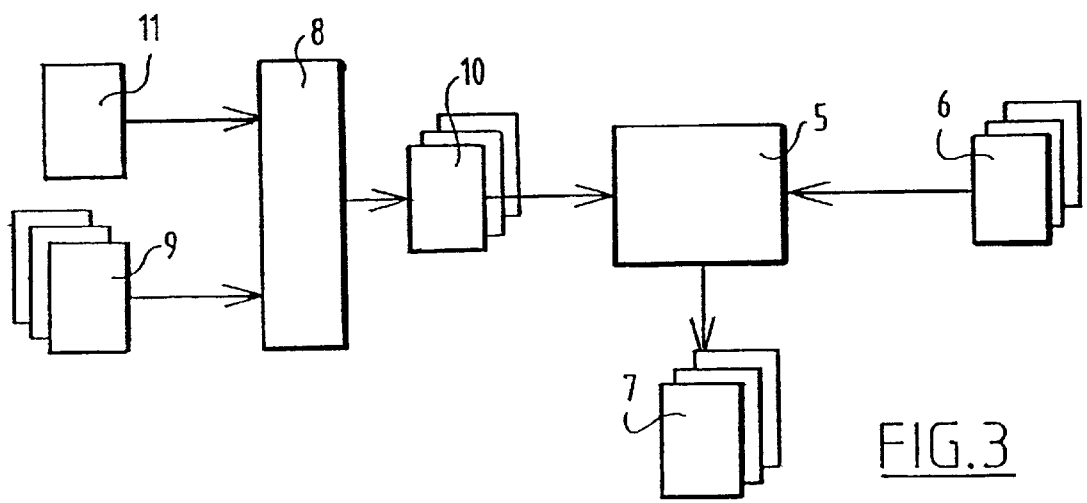
FIG. 3 shows schematically a code generator with interpretation means or parser means.

In FIG. 3 a code generator with external guidelines or coding rules 6 is shown, however also comprising an interpreter or parser 8 that enables the conversion of a specification file 9, containing a listing of distinctive features of the code to be generated, with aid of a specification language, into a set of nodes in memory 10 that is understandable to the generic code generator 5 and forms all logical relationships between the features in the specification file 9. The specification language is described in an external specification language descriptor file 11. Code generator 5 converts the set of nodes in memory 10 from the interpreter 8 into one or more suitable output code files 7, wherein. the format of this output depends on the guidelines 6. The output file 7 is in this case a C++ source file. The implementation of the generic code generator is independent on the specification language that is described in the external language description file 11. Compared to a dedicated code generator, which comprises the use of a fixed input and output language with hardcoded rules, the generic code generator according to the present invention provides variable input and output languages (viz. specification language descriptions and coding guidelines) with programmable rules. Both specification language description and coding guidelines can be custom-designed.

Figure 4:
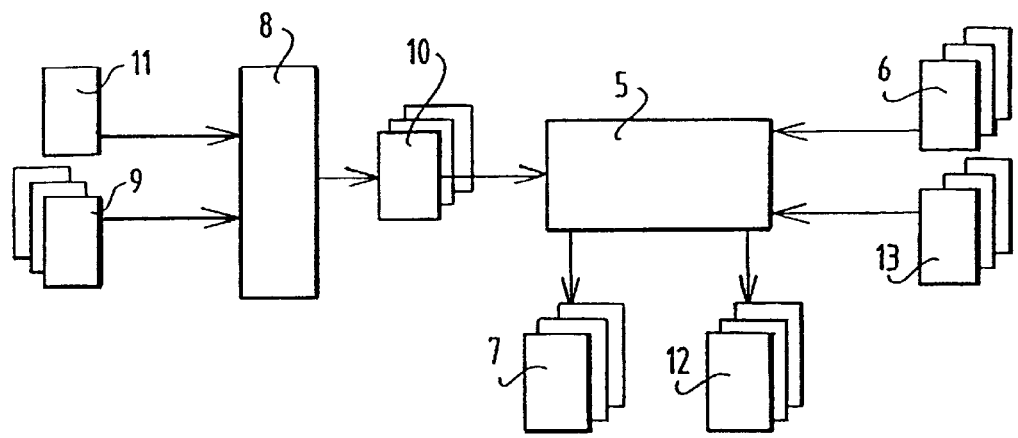
FIG. 4 shows a code generator according to FIG. 3 with two different sets of coding guidelines.

FIG. 4 shows another preferred embodiment with a specification file 9, a language description file 11, an interpreter 8 and a code generator 5. Instead of one set of external guidelines 6, an additional set of guidelines, for example in external guideline files 13, is provided. The generic code generator generates in this case two sets of codes 7 and 12, for example C++ source code and Pascal source code or C++ source code and documentation text code describing the C++ source code. Changes in the specification of the software program will be translated into changes in the source code file and documentation file accordingly. The generic code generator ensures therefore coherence between the output files, i.e. the documentation code file is consistent with the source code.

Figure 5:
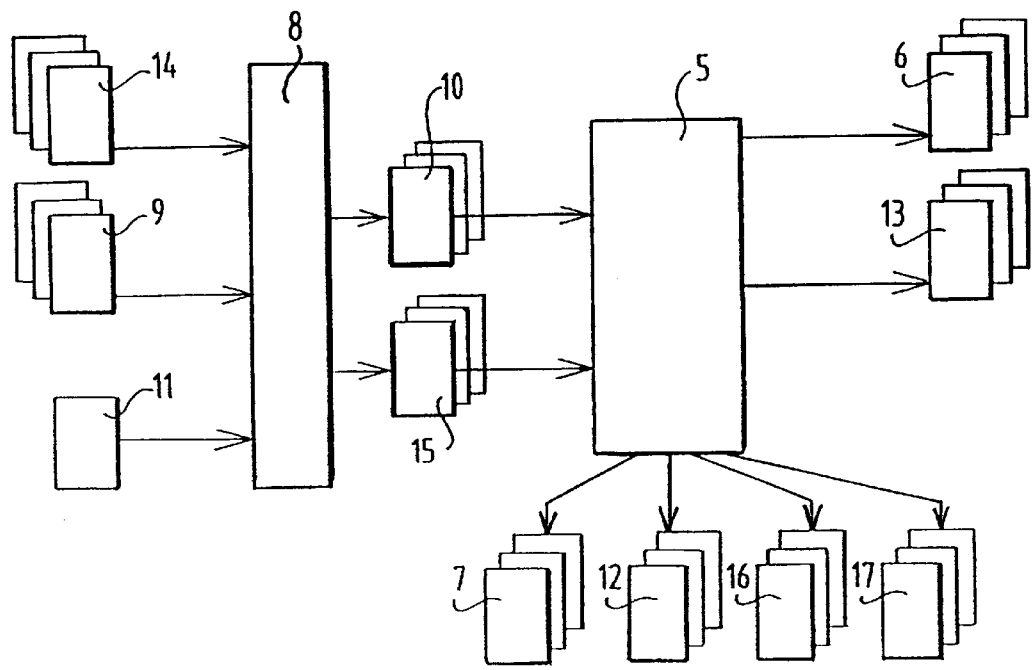
FIG. 5 shows schematically a code generator according to FIG. 3 with two sets of specification language descriptions.

FIG. 5 shows still another preferred embodiment with two sets of coding guideline files 6 and 13, a specification language description file 11, an interpreter 8 and a code generator 5. Besides one external set of specification files 9 an additional set of specification files 14 is provided. By specifying the external guideline files 6 and 13 and the external specification language description files 9 and 14 four different output code files 7, 12, 16, 17 are produced for every combination of sets of guidelines and specification language descriptions.

Figure 6:
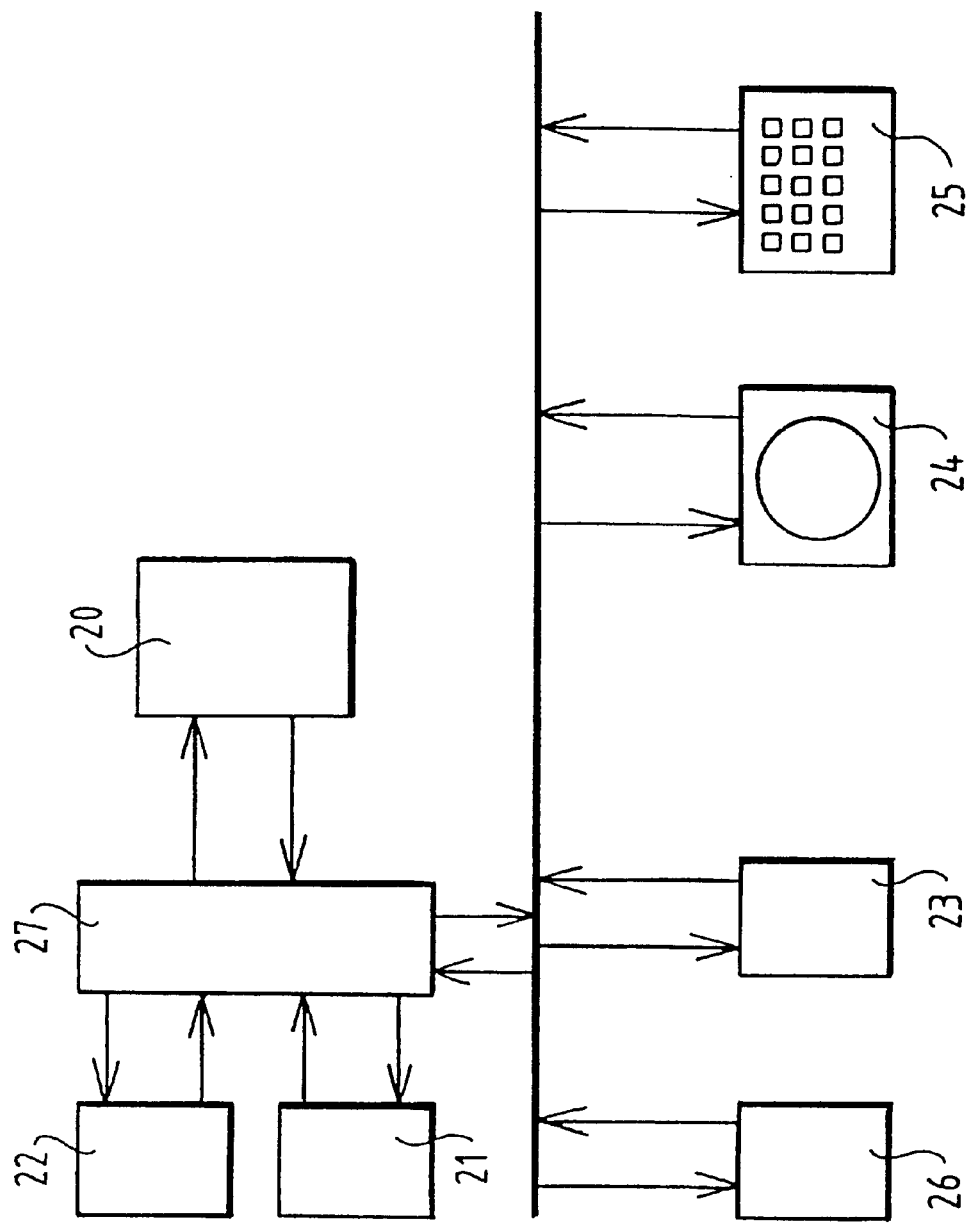
FIG. 6 shows a preferred embodiment of a system for implementing the present invention.

FIG. 6 schematically shows a preferred embodiment of a system in accordance with the present invention, comprising a personal computer or workstation with a central processing unit 20, which is connected through connector 27 to a read only memory 21, a random access memory 22, a network 23, a screen 24, a keyboard 25 and a hard disk 26. The code generator and interpreter software is fetched from the hard disk 26 or network 23, and is (partly) loaded into memory 22. The specification files of the program to be generated by the system are input by an operator with the keyboard 25 or else are present on the hard disk 26 or the network 23. Using the specification language descriptors and guidelines and the interpreter and code generator software, central processing unit 20 processes the specification files to generate a series of output code files. The output code files are stored on the hard disk 26 or are sent over network 23 to an external destination. Hereafter, the generated code can be compiled and linked with manually written code.

An example of an implementation of the embodiment of FIG. 2 is given below. The input file in this case comprises modules, interfaces, attributes, operators and parameters:

```
module Entertainment{
    interface Movie{
        void Play (in long startFrame);
        void stop();
        long Where();};
    interface Audio{
        ...};
};
```

This example describes the object interface for the classes Movie and Audio, located in a module entertainment. Objects of this class can receive three incoming messages:
the Play operation has one input parameter of type long, named startFrame;
the Stop operation without parameter;
the Where operation without parameter, returns the current frame.

An Example of a guideline file is the scriptfile given below:

```
$FOR [modules, mod]
    The module $VAR [mod.name]
    $FOR [mod.interfaces,interf]
        Interface $VAR [interf.name]
            with the following
            operations:
        $FOR [interf.operations,oper]
            $VAR [oper.name]
        $ENDFOR[, ]
    $ENDFOR [and]
$ENDFOR []
```

The resulting output of the code generator according to the above mentioned input file and guideline file is as follows:

The module Entertainment contains:
Interface Movie with the following operations:
   Play, Stop, Where
   and
   Interface, Audio with the following operations:
The guideline file contains literals and statements, wherein literals are simply copied to the output file and statements are interpreted. Since the literals are copied to the output file, the code generator is independent of the generated code. The statements that in these examples are interpreted are as follows:

$VAR [operation.name]
write the name attribute of the operation component to the generated file and
$FOR [module.interfaces,i]
   #include "$VAR [i.name].h"
$ENDFOR[ ]
iterate through all the interfaces of a module and print out an "include" line with the interface names. The iteration variable is automatically created and removed after the for loop.

A further embodiment of the present invention relates to providing an emulator for development of object-oriented software e.g. an object-oriented operating system. The behaviour of the software to be developed is simulated by the emulator on a known operating system like UNIX etc. The code generator according to the present invention translates the developed object-oriented software code into program code that runs on UNIX. In the case of development of object-oriented operation systems the drawing tool is able to simulate the synchronous and a-synchronous message passing between the program objects and to local entry mode intantiation of the active program objects. With the MSC drawing tool, the developed object-oriented software can be easily documented.

As an example of a specification file a MSC-text file is shown hereafter.

```
MSC [15] [15] FS "Opening a file"
   ROLE CLIENT p_client
   ROLE FS fs
IN p_client
   SEND p_entry fs OpenFile "fileId, cid"
AT fs p_entry
   /* Check file existance and access permissions */
   DO FileUsageCreation "fileID -> UsageID"
   REPLY p_exit pclient p_entry GotUsage
"UsageID" p_continue "<contParams>"
   AT p_client p_exit
ENDMSC
```

Figure 7:
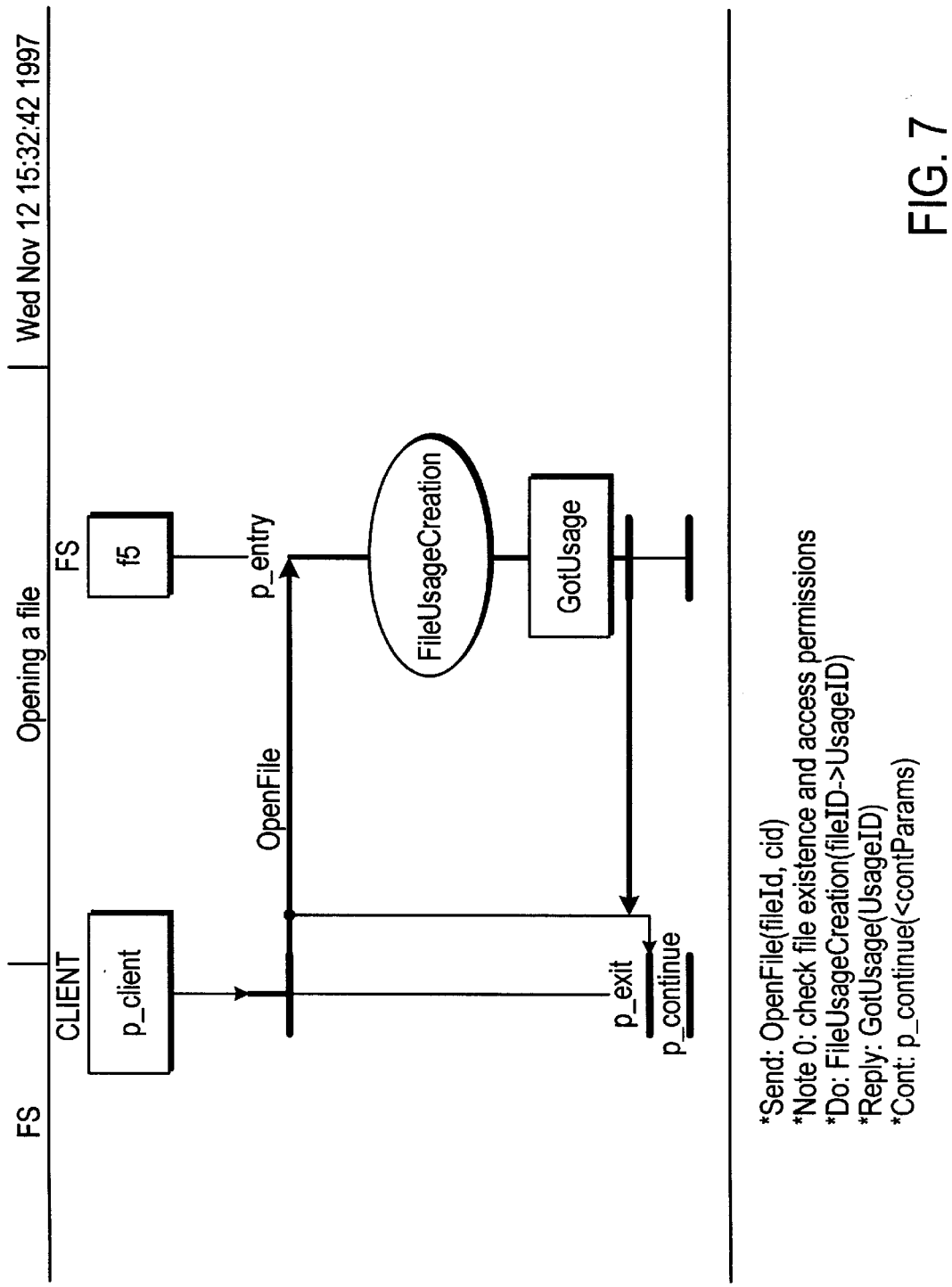
FIG. 7 shows a message sequence chart of a specification file.

MSC stands for Message Sequence Chart which is a drawing that shows how program objects interact with each other, i.e. which messages they pass to each other and in which order. The MSC-text file renders the MSC-drawing of FIG. 7. After the software programmer has tested the MSC and given his approval, the code generator translates the MSC-text, which is used as specification file, into the desired program code files.

As an example of a language description file a grammar rules definition file is shown hereafter.

```
MDL           grammar   $mscprogram $toSkip
toSkip        manyOf    $chartoSkip #null #null #null
chartoSkip    oneOf     ' ' '\t' '\n'
mscprogram    sequence  'MSC' xScale=?$int  yScale=?$int project=#id
title=#string $body 'ENDMSC'
int           sequence  '{' value=#integer '}'
body          manyOf    $stmt #null #null #null
stmt          oneOf     $in $at $object $do $skip $send $reply $call $return
$comment
comment       sequence  text=#comment
in            sequence  'IN' objId=#id
at            sequence  'AT' objId=#id msgId=#id
object        sequence  'ROLE' xPos=?$int class=#id objId=#id
do            sequence  'DO' name=#id text=#string
skip          sequence  'SKIP' deltaY=?$int
send          sequence  'SEND' deltaX=?$int deltaY=?$int msgId=#id objId=#id
sendName=#id sendParams=#string
reply         sequence  'REPLY' deltaX=?$int deltaY=?$int msgId=#id objId=#id
sendId=#id replyName=#id replyParams=#string contName=#id contParams=#string
?$alsoReplies
alsoReplies   manyOf    $also 'ALSO' #null 'ALSO'
also          sequence  deltaX=?$int deltaY=?$int msgId=#id objId=#id
sendId=#id contName=#id contParams=#string
call          sequence  'CALL' deltaX=?$int deltaY=?$int msgId=#id objId=#id
callName=#id callParams=#string
return        sequence  'RETURN' deltaX=?$int deltaY=?$int msgId=#id
objId=#id callId=#id replyName=#id replyParams=#string
# include statement are not used anymore
include       sequence  'INCLUDE' xPos=?$int file=#pathname name=#id 'WHERE'
$wClauses
wClauses      manyOf    $wClause '{' '}' ','
wClause       oneOf     $oClause $cClause $mClause $lClause
oClause       sequence  'INSTANCE' from=#id '=' to=#id
cClause       sequence  'CLASS' from=#id '=' to=#id
mClause       sequence  'MESSAGE' from=#id '=' to=#id
lClause       sequence  'LABEL' from=#id '=' to= #id
```

As an example of a coding guidelines file a WALK coding file is shown hereafter.

```
$*[********************************************************************  *
*    script : MSC.tcl                                                    *
*    This script converts an MSC description into a TCL program.         *
*    copyright : Sony Objective Composer (SOCOM)                         *
*    author : andre                           last update : 19/09/97     *
*********************************************************************** *
*    12/06/97 Adding CALL and RETURN                                     *
*    12/06/97 simplified version - Removing INCLUDE                      *
*    19/09/97 usign IVS_SRC_ROOT environment variable                    *
*********************************************************************** *]
$*[-comment class-------]
$CLASS [comment]
$SCRIPT (toTCL)
   COMMENT "$VAR[me.text]"
$ENDSCRIPT
$ENDCLASS
$*[-object class-------]
$CLASS [object]
$SCRIPT [toTCL]
$    *[static object are translated into OBJECT, dynamic into NEW]
$    IF[IsStatic]
   set o_$VAR[me.objId]  [OBJECT "$VAR[me.objId]" "$VAR[me.class]"]
$    ELSE
   set o_$VAR[me.objId]  [NEW "$VAR[me.objId]" "$VAR[me.class]"
$    IF[me.has_xPos] $SET[me.xPos,p]$VAR(p.value)$ELSE 0$ENDIF
   ]
$    ENDIF
$ENDSCRIPT
$ENDCLASS
$*[-in class----------]
$CLASS [in]
$SCRIPT [toTCL]
$    SET[FALSE,IsStatic]
IN $[$o_]$VAR[me.objId]   "???"
$ENDSCRIPT
$ENDCLASS
$*[-at class----------]
$CLASS [at]
$SCRIPT [toTCL]
$    SET[FALSE,IsStatic]
AT $[$m_]$VAR[me.msgId] "$VAR[me.msgId]"
$ENDSCRIPT
$ENDCLASS
$*[-skip class---------]
$CLASS [skip]
$SCRIPT [toTCL]
SKIP $IF(me.has_deltaY] $SET[me.deltaY,d]$VAR[d.value]$ELSE 1$ENDIF
$ENDSCRIPT
$ENDCLASS
$*(-do class-----------]
$CLASS [do]
$SCRIPT [toTCL]
DO $VAR[me.name] "$VAR[me.text]"
$ENDSCRIPT
$ENDCLASS
$*[-send class---------]
$CLASS [send]
$SCRIPT [toTCL]
set m_$VAR[me.msgId] [SEND $[$o_]$VAR[me.objId] "$VAR[me.sendName]"
"$VAR[me.sendParams]"
$IF[me.has_deltaX] $SET[me.deltaX,d]$VAR[d.value]$ELSE 0$ENDIF
$IF[me.has_deltaY] $SET[me.deltaY,d]$VAR[d.value]$ELSE 0$ENDIF
   ]
$ENDSCRIPT
$ENDCLASS
$*[-also class---------]
$CLASS [also]
$SCRIPT [toTCL]
set m_$VAR[me.msgId] [ALSO $[$o_]$VAR[me.objId] $*[$]$VAR[me.sendId]
   "$VAR[me.contName]" "$VAR[me.contParams]"
$IF[me.has_deltaX] $SET[me.deltaX,d]$VAR[d.value]$ELSE 0$ENDIF
$IF[me.has_deltaY] $SET[me.deltaY,d]$VAR[d.value]$ELSE 0$ENDIF
   ]
$ENDSCRIPT
$ENDCLASS
$*[-reply class--------]
$CLASS.[reply]
$SCRIPT [toTCL]
set m_$VAR[me.msgId] [REPLY $[$o_]$VAR[me.objId] $[$m_]$VAR[me.sendId]
```

-continued

```
    "$VAR[me.replyName]" "$VAR[me.replyParams]"
    "$VAR[me.contName]" "$VAR[me.contParams]"
$IF[me.has__deltaX] $SET[me.deltaX,d]$VAR[d.value]$ELSE 1$ENDIF
$IF[me.has__deltaY] $SET[me.deltaY,d]$VAR[d.value]$ELSE 1$ENDIF
    ]
$IF[me.has__AlsoReplies]
$    FOR[me.has__AlsoReplies,also]
$      ONDO[also,toTCL]
$      CR
$    ENDFOR[]
$ENDIF
$ENDSCRIPT
$ENDCLASS
$*[-call class---------]
$CLASS [call]
$SCRIPT [toTCL]
set m_$VAR[me.msgId] [CALL $[$o__]$VAR[me.objId] "$VAR(me.callName]"
"$VAR[me.callParams]"
$IF[me.has__deltaX] $SET[me.deltaX,d]$VAR[d.value]$ELSE 0$ENDIF
$IF[me.has__deltaY] $SET[me.deltaY,d]$VAR[d.value]$ELSE 0$ENDIF
    ]$CR
AT $[$m__]$VAR[me.msgId] "$VAR[me.msgId]"
$ENDSCRIPT
$ENDCLASS
$*[-return class---------]
$CLASS [return]
$SCRIPT [toTCL]
set m_$VAR[me.msgId] [RETURN $[$o__]$VAR[me.objId] $[$m__]$VAR[me.callId]
    "$VAR[me.replyName]" "$VAR[me.replyParams]"
$IF[me.has__deltaX] $SET[me.deltaX,d]$VAR[d.value]$ELSE 0$ENDIF
$IF[me.has__deltaY] $SET[me.deltaY,d]$VAR[d.value]$ELSE 0$ENDIF
    ]$CR
BACK $[$m__]$VAR[me.msgId] $VAR[me.msgId]"
$ENDSCRIPT
$ENDCLASS
$*[-main program--------]
$GETENV[IVS__SRC__ROOT,tclFile]
$APPENDSTRING["/languages/msc/msc.tcl",tclFile]
$INSERTVAR[tclFile]$CR
$CR
Init$CR
SCALE
$IF[top.has__xScale] $SET[top.xScale,s]$VAR[s.value]$ELSE 100$ENDIF
$IF[top.has__yScale] $SET[top.yScale,s]$VAR[s.value]$ELSE 20$ENDIF
$CR
TITLE "$VAR[top.project]" "$VAR[top.title]" "$ASCTIME "$CR
$    SET[TRUE,IsStatic]
$    FOR[top.body,stmt]
$      ONDO[stmt,toTCL]
$      CR
$ENDFOR[]
Exit
```

As an example of a program code file the following TCL file is shown hereafter.

```
proc Init {} {
    global argv psfile verbose origin
    set psfile " "
    set origin " "
    set verbose 0
    set version [info tclversion]
    for {set c 0} {$c < [llength $argv]} {incr c} {
        set arg [lindex $argv $c]
          set type [string range $arg 0 1]
        if ( $type == "-p") {
              if { $version == "7.5" } {
                set psfile [string range $arg 2 [string length $arg]]
              }
        }
        if { $type == "-o"} {
            set origin [string range $arg 2 [string length $arg]]
            if { [string index $origin 0] != "/"} {
```

-continued

```
                set path [pwd]
                append path "/"
                append path $origin
                set origin $path
            }
        }
        if { $arg == "-notes"} {
            set verbose 1
        }
    }
    global nof_notes notesT notesC
    set nof_notes 0
    global lbEntryCount
    set lbEntryCount 0
    global commentCount
    set commentCount 0
    global nof_objects
    set nof_objects 0
    global next_object
    set next_object 0
    global nof_messages
    set nof_messages 0
    global startY
    set startY 0
    global smallFont
    set smallFont "-adobe-times-bold-r-normal--12-120-75-75-p-67-iso8859-1"
    global largeFont
    set largeFont "-adobe-times-bold-r-normal--14-140-75-75-p-77-iso8859-1"
    listbox .lb
    canvas .c -bg bisque -width 800 -height 800
#     image create photo .c.logo_image -file "ivs_logo.gif"
}
proc SCALE {scaleX scaleY} {
    global xgrid ygrid
    set xgrid $scaleX
    set ygrid $scaleY
    global currX currY
    set currX [expr $xgrid / 2]
    set currY [expr $ygrid * 5]
    global currObj objects
    set currObj −1
    for {set o 0} {$o < 10} { incr o 1} {
        set objects($o) 0
    }
}
proc Exit {} {
    global psfile verbose
    global lbEntryCount smallFont
    global nof_objects objects
    global currX currY xgrid ygrid
    global nof_notes notesT notesC
    if {$lbEntrycount != 0} {
        pack .lb -side bottom
        return
    }
    .c create line [expr $currX − 10 ] $currY [expr $currX + 10] $currY \
        -fill blue -width 3
    set maxY 0
    for {set o 0} {$o < 10} { incr o 1} {
        if {$objects($o) > $maxY} { set maxY $objects($o) }
    }
    incr maxY $ygrid
    for {set o 0} {$o < 10} { incr o 1} {
        if {$objects($o) > 0} {
            set x [expr [expr $o * $xgrid] + $xgrid]
            .c create line $x $objects($o) $x $maxY -fill gray
            .c create line [expr $x − 20]$maxY [expr $x + 20] $maxY -width 2
        }
    }
    incr maxY $ygiid
    set endDrawY $maxY
    .c create line 0 $maxY 800 $maxY -fill gray -width 3
    if { $verbose } {
       for {set n 0} {$n < $nof_notes} {incr n} {
         set text $notesT($n)
         set t [.c create text [expr $xgrid / 4] $maxY -text $text -font $smallFont -fill $notesC($n)]
         set coord [.c bbox $t]
```

-continued

```
            set dy [expr [lindex $coord 3] – [lindex $coord 1]]
            .c move $t [expr [expr [lindex $coord 2] – [lindex $coord0]]
/ 2] [expr $dy /2]
            incr maxY $dy
            if { [expr $maxY % 800] > [expr 800 – $ygrid] } {
                incr maxY $ygrid
            }
            incr maxY [expr $ygrid /4]
        }
    }
    if { $maxY > 800 } {
            set pageTop 800
            set pageNb 1
            set pageCount [expr 1 + [expr [expr $maxY – 1] / 800 ]]
            while { $pageNb <= $pageCount } {
                set t "page "
                append t $pageNb
            append t " of "
                append t $pageCount
                drawText 700 $pageTop $t $smallFont red biscue 0 –1
                .c create line 0 $pageTop 800 $pageTop -fill red -width 1
                incr pageTop 800
            incr pageNb
            }
            set maxY [expr $pageCount * 800]
            .c configure -scrollregion [list 0 0 800 $maxY]
            .c configure -yscrollcommand ".scrolly set"
            #       scrollbar .scrollx -command ".c xview" -orient horizontal
            scrollbar .scrolly -command ".c yview"
            pack .scrolly -side right -fill y
        }
#    pack .scrollx -side bottom -fill x
    set text "none"
    pack .c -side top
#    pack .lb -side bottom
    if { $psfile != "" } {
            # generate a postscript file
            update
            incr maxY $ygrid
            set pageTop 0
            set pageCount 0
        while { $pageTop < $maxY } {
            set file $psfile
                append file $pageCount
                .c postscript -height 800 -width 800 -y $pageTop -file
$file -colormode gray
                incr pageTop 800
                incr pageCount 1
            }
        }
}
proc drawText {x y t f fc bc b w} {
    set t [.c create text $x $y -text $t -font $f -fill $fc]
    set coord [.c bbox $t]
    set dy [expr [expr [lindex $coord 3] – [lindex $coord 1]] /2]
    if {$w != 0} {
        .c move $t 0 [expr $w * $dy]
    }
    set coord [.c bbox $t]
    set left [expr [lindex $coord 0] – $b]
    set top [expr [lindex $coord 1] – $b]
    set right [expr [lindex $coord 2] + $b]
    set bottom [expr [lindex $coord 3] + $b]
    if {$b !=0} {
        .c create rectangle $left $top $right $bottom -fill $bc -outline $fc
        .c raise $t
    }
    return $t
}
proc drawOvalText {x y text f fc bc b w} {
    set t [.c create text $x $y -text $text -font $f -fill $fc]
    set coord [.c bbox $t]
    set dy [expr [expr [lindex $coord 3] – [lindex $coord 1]] /2]
    if {$w != 0} {
        .c move $t 0 [expr $w * $dy]
    }
    set coord [.c bbox $t]
    set left [expr [lindex $coord 0] – $b]
    set top [expr [lindex $coord 1] – $b]
```

-continued

```
        set right [expr [lindex $coord 2] + $b]
        set bottom [expr [lindex $coord 3] + $b]
        if {$b !=0} {
            set oval [.c create oval $left $top $right $bottom -fill $bc -outline
$fc]
            .c raise $t
        }
        return $t
    }
}
proc BindText {x y text fc b} {
        global largeFont
        set bindText [.c create text $x $y -text $text -font $largeFont -fill $fc]
        set coord [.c bbox $bindText]
        set left [lindex $coord 0]
        set top [lindex $coord 1]
        set right [lindex $coord 2]
        set bottom [lindex $coord 3]
        set width 800
        set height 800
        #move text if it exceeds canvas borders
        if {$left < 0} {
            .c move $bindText [expr 0 - $left] 0
            set left 0
        }
        if {$right > $width} {
            .c move $bindText [expr $width - $right] 0
            set right $width
        }
        if {$top < 0} {
            .c move $bindText 0 [expr 0 - $top]
            set top 0
        }
        if {$bottom > $height} {
            .c move $bindText 0 [expr $height - $bottom]
            set bottom $height
        }
        return $bindText
}
proc BindMsgPress {class msg params x y fc} {
        global bindText bindRect
        set text $msg
        append text "("
        append text $params
        append text ")"
        set b 5
        set bindText [BindText $x $y $text $fc $b]
        set coord [.c bbox $bindText]
        set left [expr [lindex $coord 0] - $b]
        set top [expr [lindex $coord 1] - $b]
        set right [expr [lindex $coord 2] + $b]
        set bottom [expr [lindex $coord 3] + $b]
        if {$b !=0} {
            set bindRect [.c create rectangle $left $top $right $bottom -fill
lightgray ]
            .c raise $bindText
        }
}
proc BindMSCPress {msc comment x y fc} {
        global bindText bindRect
        set text $msc
        append text $comment
        set b 5
        set bindText [BindText $x $y $text $fc $b]
        set coord [.c bbox $bindText]
        set left [expr [lindex $coord 0] - $b]
        set top [expr [lindex $coord 1] - $b]
        set right [expr [lindex $coord 2] + $b]
        set bottom [expr [lindex $coord 3] + $b]
        if {$b !=0} {
            set bindRect [.c create rectangle $left $top $right $bottom -fill
lightgray ]
            .c raise $bindText
        }
}
proc BindDoPress { name comment x y fc} {
        global bindText bindRect largeFont
        set text $name
        append text " : "
        append text $comment
```

-continued

```
        set b 5
        set bindText [BindText $x $y $text $fc $b]
        set coord [.c bbox $bindText]
        set left [expr [lindex $coord 0] - $b]
        set top [expr [lindex $coord 1] - $b]
        set right [expr [lindex $coord 2] + $b]
        set bottom [expr [lindex $coord 3] + $b]
        if {$b !=0} {
           set bindRect [.c create oval $left $top $right $bottom -fill lightgray ]
              .c raise $bindText
        }
    }
}
proc BindRelease {} {
    global bindText bindRect
    .c delete $bindText
    .c delete $bindRect
}
proc drawObject {x y nm cl} {
    global class objects nof_objects next_object
    global smallFont xgrid ygrid
    set xcenter    [expr [expr $x + 1] * $xgrid]
    drawText $xcenter $y $cl $smallFont red bisque 0 -2
    drawText $xcenter $y $nm $smallFont blue lightgray 2 0
    set objects($x) $y
    set class($x) $cl
    if { $x == $next_object } {
        incr next_object
    }
    incr nof_objects
}
proc addMessage {fromX toX toY toObj fromY} {
    global nof_messages messages currX
    set msg_index $nof_messages
    set messages($msg_index,0) $fromX
    set messages($msg_index,1) $toX
    if {$currX < $toX} {
        set messages($msg_index,2) 20
    } else {
        set messages($msg_index,2) -20
    }
    set messages($msg_index,3) $toY
    set messages($msg_index,4) $toObj
    set messages($msg_index,5) $fromY
    incr nof_messages
    return $msg_index
}
proc ADDNOTE {text color} {
    global nof_notes notesT notesC
    set notesT($nof_notes) "* "
    append notesT($nof_notes) $text
    set notesC($nof_notes) $color
    incr nof_notes
}
proc TITLE {nm comment date} {
    global xgrid ygrid
    global largeFont smallFont origin
    set bot [expr $ygrid * 2]
    set right 800
    drawText 100 $ygrid $nm $largeFont black black 0 0
    drawText 400 [expr $ygrid / 2] $comment $largeFont black black 0 0
    drawText 400 [expr [expr $ygrid * 3] / 2] $origin $smallFont indianred
indianred 0 0
    drawText 700 $ygrid $date $smallFont black black 0 0
    .c create line 0 $bot $right $bot -fill gray -width 5
    set tx 200
    .c create line $tx 0 $tx $bot -fill gray -width 3
    set tx 600
    .c create line $tx 0 $tx $bot -fill gray -width 3
}
proc OBJECT {nm cl} {
    global xgrid ygrid next_object
    Set index $next_object
    drawObject $index [expr 4 * $ygrid] $nm $cl
    return $index
}
proc drawMSC {x y nm cl} {
    global class objects nof_objects next_object smallFont
    global xgrid ygrid xMSC yMSC MSCText
    set xcenter    [expr [expr $x + 1] * $xgrid]
```

-continued

```
    set y [expr $y + $ygrid]
    set xMSC $xcenter
    set yMSC $y
    set MSCText [drawText $xcenter $y $nm $smallFont black lightgray 2 −1]
    .c bind $MSCText <Any-ButtonPress> "BindMSCPress \"$mn\" \"$cl\" $xMSC
$yMSC black"
    .c bind $MSCText <Any-ButtonRelease> "BindRelease "
    set objects($x) $y
    set class($x) $nm
    if { $x == $next_object } {
        incr next_object
    }
    incr nof_objects
}
proc BEGIN_MSC {nm cl x} {
    global xgrid ygrid next_object currY
    if {$x == 0} {
        set index $next_object
    } else {
        set index $x
    }
    set last [string last "/" $nm ]
    if {$last != −1} {
        incr last
        set len [string length $nm]
        set nm [string range $nm $last $len ]
    }
    drawMSC $index $currY $nm $cl
    return $index
}
proc END_MSC { } {
    global xMSC yMSC xgrid ygrid currY MSCText
    set left [expr $xMSC − [expr $xgrid / 2] ]
    set right [expr $xMSC + [expr $xgrid / 2] ]
    set top $yMSC
    set bottom $currY
    set border [.c create rectangle $left $top $right $bottom -outline black
-width 6]
    .c create rectangle $left $top $right $bottom -outline gray -width 5
    .c raise $MSCText $border
}
proc NEW {nm cl x} {
    global xgrid ygrid currX currY next_object
    if {$x == 0} {
        set x $next_object
    }
    drawObject $x $currY $nm $cl
    SKIP 1
    set toX [expr [expr $x + 1] * $xgrid]
    .c create line $currX $currY $toX $currY -arrow last
    set objects($x) $currY
    return $x
}
proc SEND {obj name params delta reserve} {
    global currX currY ygrid messages nof_messages startY
    global class objects smallFont xgrid ygrid
    SKIP 1
    set toX [expr [expr $obj + 1] * $xgrid]
    set toY $currY
    set X $toX
    if {$currY <= $objects{$obj}} {
        set toY $objects($obj)
        if {$delta == 0} {
            set delta 1
        }
    }
    if {$delta != 0} {
        incr toY [expr $reserve * $ygrid]
    }
    set msg [addMessage $currX $toX $toY $obj $currY]
    if {$delta == 0} {
        .c create line $currX $currY $toX $currY -fill blue -arrow
last -width 2
    } else {
        set X [expr $toX − [expr $delta * $messages($msg.2) ] ]
        .c create line $currX $currY $X $currY -fill blue -width 2
        .c create line $X $currY $X $toY -fill blue -width 2
        .c create line $toX $toY $X $toY -fill blue -arrow first -
width 2
```

```
        }
        set textX [expr [expr $currX + $X] / 2]
        set t [drawText $textX $currY $name $smallFont blue blue 0 −1]
        .c bind $t <Any-ButtonPress> "BindMsgPress $class($obj) \"$name\"
\"$params\" $textX $currY blue"
        .c bind $t <Any-ButtonRelease> "BindRelease "
        set note "Send: "
        append note $name
        append note "("
        append note $params
        append note ")"
        ADDNOTE $note blue
        return $msg
}
proc CALL {obj name params delta reserve} {
        global currX currY ygrid messages nof_messages startY
        global class objects smallFont xgrid ygrid
        SKIP 1
        set toX [expr [expr $obj + 1] * $xgrid]
        set toY $currY
        set X $toX
        if {$currY <= $objects($obj)} {
            set toY $objects($obj)
            if {$delta == 0} {
               set delta 1
            }
        }
        if {$delta != 0} {
            incr toY [expr $reserve * $ygrid]
        }
        set msg [addMessage $currX $toX $toY $obj $currY]
        if {$delta == 0} {
            .c create line $currX $currY $toX $currY -fill blue -arrow
last -width 2
        } else {
            set X [expr $toX − [expr $delta * $messages($msg,2) ] ]
            .c create line $currX $currY $X $currY -fill blue -width 2
            .c create line $X $currY $X $toY -fill blue -width 2
            .c create line $toX $toY $X $toY -fill blue -arrow first -
width 2
        }
        set textX [expr [expr $currX + $X] / 2]
        set t [drawText $textX $currY $name $smallFont blue blue 0 −1]
        .c bind $t <Any-ButtonPress> "BindMsgPress $class($obj) \"$name\"
\"$params\" $textX $currY blue"
        .c bind $t <Any-ButtonRelease> "BindRelease "
        set note "Call: "
        append note $name
        append note "("
        append note $params
        append note ")"
        ADDNOTE $note blue
        return $msg
}
proc atObject {msg name color w a} {
        global currX currY messages startY
        global objects currObj smallFont xgrid ygrid
        if ($currObj != −1} {
            .c create line [expr $currX − 10 ] $currY [expr $currX + 10]
$currY \
             -fill blue -width 3
        }
        set currX $messages($msg,1)
        set currY $messages($msg,3)
        set currObj $messages($msg,4)
        .c create line $currX $objects($currObj)    $currX $currY -fill $color -
width $w -arrow $a
        drawText $currX $currY $name $smallFont $color black 0 −1
        set startY $currY
        if {$objects($currObj) != 0} {
            set objects($currObj) $currY
        }
}
proc AT {msg name} {
    atObject $msg $name gray 1 none
}
proc BACK {msg name} {
    atObject $msg $name blue 1 none
}
```

-continued

```
proc IN {obj name} {
    global currX currY messages startY objects currObj smallFont xgrid ygrid
    if {$currObj == -1} {
        set currObj $obj
        set currX [expr [expr $obj + 1] * $xgrid]
        set startY [expr $currY + $ygrid]
        .c create line $currX $currY $currX $startY -fill blue -width
1 -arrow last
        set currY $startY
    }
    if {$objects($currobj) != 0} {
        set objects($currObj) $currY
    }
}
proc DO {name text} {
    global currY currX smallFont startY objects currObj xgrid ygrid
    SKIP 1
    set t [drawOvalText $currX $currY $name $smallFont darkgreen lightgray 5 1]
    set coord [.c bbox $t]
    incr currY [expr [lindex $coord 3] - [lindex $coord 1]]
    incr currY 5
    .c bind $t <Any-ButtonPress> "BindDoPress    \"$name\" \"$text\" $currX
$currY darkgreen"
    .c bind $t <Any-ButtonRelease> "BindRelease "
    set startY $currY
    if {$objects($currObj) != 0} {
        set objects($currObj) $currY
    }
    set note "Do: "
    append note $name
    append note "("
    append note $text
    append note ")"
    ADDNOTE $note darkgreen
}
proc SKIP {delta} {
    global currX currY startY currObj objects xgrid ygrid
    incr currY [expr $ygrid * $delta]
    if {$currObj != -1} {
        .c create line $currX $startY $currX $currY -width 3 -fill blue
        if {$objects($currObj) != 0} {
            set objects($currObj) $currY
        }
    }
}
proc REPLY {obj msg reply replyPar cont contPar delta reserve} {
    global currX currY messages nof_messages
    global startY class objects currObj smallFont xgrid ygrid
    SKIP 1
    set t (drawText $currX $currY $reply $smallFont red gray 2 1]
    .c bind $t <Any-ButtonPress> "BindMsgPress $class($obj) \"$reply\"
\"$replyPar\" $currX $currY red"
    .c bind $t <Any-ButtonRelease> "BindRelease "
    set coord [.c bbox $t]
    incr currY [expr [lindex $coord 3] - [lindex $coord 1]]
    incr currY 2
    set startY $currY
    set text "Reply: "
    append text $reply
    append text "("
    append text $replyPar
    append text ")"
    ADDNOTE $text red
    return [ALSO $obj $msg $cont $contPar $delta $reserve 0]
}
proc RETURN {obj msg reply replyPar delta reserve} {
    global currX currY messages nof_messages
    global startY class objects currObj smallFont xgrjd ygrid
    SKIP 1
    set t [drawText $currX $currY $reply $smallFont red gray 2 1]
    .c bind $t <Any-ButtonPress> "BindMsgPress $class($obj) \"$reply\"
\"$replyPar\" $currX $currY red"
    .c bind $t <Any-ButtonRelease> "BindRelease "
    set coord [.c bbox $t]
    incr currY [expr [lindex $coord 3] - [lindex $coord 1]]
    incr currY 2
    set startY $currY
    set text "Return: "
    append text $reply
```

-continued

```
        append text "("
        append text $replyPar
        append text ")"
        ADDNOTE $text red
        set toX [expr [expr $obj + 1] * $xgrid]
        set X [expr $messages($msg,0) + [expr $delta * $messages($msg,2) ] ]
        .c create line $currX $currY $X $currY -fill blue -arrow last -width 2
        set msg_index [addMessage $currX $X $currY $obj $currY]
        return $msg_index
}
proc ALSO {obj msg cont contPar delta reserve skip} {
        global currX currY messages nof_messages
        global startY class objects currObj smallFont xgrid ygrid
    SKIP $skip
        set toX [expr [expr $obj + 1] * $xgrid]
        set X [expr $messages($msg,0) + [expr $delta * $messages($msg,2) ] ]
        .c create line $currX $currY $X $currY -fill red -arrow last -width 2
        if {$currY <= $objects($obj)} {
                set toY $objects($obj)
        } else {
                set toY $currY
        }
        if ($delta != 0} {
                incr toY [expr $reserve * $ygrid]
        }
        .c create oval [expr $X - 2] [expr $messages($msg,5) - 2] \
                [expr $X + 2] [expr $messages($msg,5) + 2] -fill purple
        .c create line $X $messages($msg,5) $X $toY -fill purple -width 2
        .c create line $toX $toY $X $toY -arrow first -fill purple -width 2
        set textY $toY
        set textX $X
        set t [drawText $textX $textY $cont $smallFont purple purple 0 1]
        .c bind $t <Any-ButtonPress> "BindMsgPress $class($obj) \"$cont\"
\"$contPar\" $textX $textY purple"
        .c bind $t <Any-ButtonRelease> "BindRelease "
        set msg_index [addMessage $currX $toX $toY $obj $currY]
        if {$objects($currObj) != 0} {
                incr objects($currObj) $ygrid
        }
        set note "Cont: "
        append note $cont
        append note "("
        append note $contPar
        append note ")"
        ADDNOTE $note purple
        return $msg_index
}
proc COMMENT {text} {
        global currX currY smallFont commentCount
        set t [drawText [expr $currX - 10] $currY $commentCount $smallFont gold
gray 1 -1]
        SKIP 1
        set note "Note "
        append note $commentCount
        append note ": "
        append note $text
        ADDNOTE $note black
        incr commentCount
}
proc ERROR {text} {
        global lbEntryCount
        incr lbEntryCount
        .lb insert end $text
}
Init
SCALE 150 15
TITLE "FS" "Opening a file" "Wed Nov 12 15:32:42 1997 "
   set o_p_client [OBJECT "p_client" "CLIENT"]
   set o_fs [OBJECT "fs" "FS"]
IN $o_p_client "???"
set m_p_entry [SEND $o_fs "OpenFile" "fileId, cid" 0 0 ]
AT $m_p_entry "p_entry"
   COMMENT " check file existence anc access permissions "
DO FileUsageCreation "fileID-> UsageID"
set m_p_exit [REPLY $o_p_client $m_p_entry "GotUsage" "UsageID" "p_continue"
"<contParams>" 1 1 ]
AT $m_p_exit "p_exit"
Exit
```

What is claimed is:

1. A method of generating code for a software program, comprising the steps of:

converting input specification files into a set of nodes using an interpreter and specification language description files; said input specification files containing a list of distinctive features of the software program to be generated and being written in a prescribed input language; said specification language description files describing at least one specification language; said set of nodes forming the logical relationship between the distinctive features listed in the input specification files as interpreted by the at least one specification language described in the specification language description files;

storing said set of nodes in a memory; and generating output code files from said set of nodes stored in said memory using external guideline files containing guidelines for generating code from the nodes in at least two code languages; said output code files being generated in said at least two code languages.

2. The method according to claim 1, wherein said output code files for each code language comprise a source code file and a documentation code file.

3. The method according to claim 1, wherein said specification language description files describe two specification languages; said set of nodes forming the logical relationship between the distinctive features listed in the input specification files as interpreted by both specification languages; and output code files being generated in each code language for both specification languages.

4. The method according to claim 1, wherein said prescribed input language for said input specification files is interface definition language.

5. The method according to claim 1, wherein said specification language description files are message sequence chart files.

6. A code generating apparatus for generating code for a software program, comprising:

an interpreter for converting input specification files into a set of nodes using specification language description files; said input specification files containing a list of distinctive features of the software program to be generated and being written in a prescribed input language; said specification language description files describing at least one specification language; said set of nodes forming the logical relationship between the distinctive features listed in the input specification files as interpreted by the at least one specification language described in the specification language description files;

a memory for storing said set of nodes output from said interpreter; and a generic code generator for generating output code files from said set of nodes stored in said memory means using external guideline files containing guidelines for generating code from the nodes in at least two code languages; said output code files being generated in said at least two code languages.

7. The code generating apparatus according to claim 6, wherein said output code files for each code language comprise a source code file and a documentation code file.

8. The code generating apparatus according to claim 6, wherein said specification language description files describe two specification languages; said set of nodes forming the logical relationship between the distinctive features listed in the input specification files as interpreted by both specification languages; and output code files being generated in each code language for both specification languages.

9. The code generating apparatus according to claim 6, wherein said prescribed input language for said input specification files is interface definition language.

10. The code generating apparatus according to claim 6, wherein said specification language description files are message sequence chart files.

* * * * *